United States Patent
Lin et al.

(10) Patent No.: US 8,692,450 B2
(45) Date of Patent: Apr. 8, 2014

(54) SURFACE LIGHT SOURCE APPARATUS WITH DUAL-SIDE EMITTING LIGHT

(75) Inventors: Yi-Ping Lin, Changhua County (TW); Shih-Pu Chen, Hsinchu (TW); Jung-Yu Li, Taipei County (TW); Lian-Yi Cho, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 3 days.

(21) Appl. No.: 13/224,336

(22) Filed: Sep. 2, 2011

(65) Prior Publication Data

US 2011/0316412 A1 Dec. 29, 2011

Related U.S. Application Data

(62) Division of application No. 12/050,186, filed on Mar. 18, 2008, now Pat. No. 8,049,400.

(30) Foreign Application Priority Data

Dec. 31, 2007 (TW) .............................. 96151533 A

(51) Int. Cl.
*H01J 61/48* (2006.01)
(52) U.S. Cl.
USPC ........................................................ 313/485
(58) Field of Classification Search
USPC .................. 313/483–485, 461, 463
See application file for complete search history.

(56) References Cited

U.S. PATENT DOCUMENTS

| 2003/0001492 A1 * | 1/2003 | Pei et al. .................. 313/496 |
| 2005/0017648 A1 | 1/2005 | Naaman et al. |
| 2005/0062413 A1 | 3/2005 | Francke |
| 2006/0125373 A1 | 6/2006 | Lin et al. |

FOREIGN PATENT DOCUMENTS

| CN | 1618113 | 5/2005 |
| EP | 1691585 A1 * | 8/2006 |
| JP | H05-047297 | 2/1993 |
| JP | H07-021984 | 1/1995 |
| JP | H08-031303 | 2/1996 |
| JP | 2002208366 | 7/2002 |
| JP | 2003045376 | 2/2003 |
| JP | 2004-146364 | 5/2004 |

(Continued)

OTHER PUBLICATIONS

"Office Action of Japan Counterpart Application (application No. 2008-089600)", issued on Nov. 15, 2011, p. 1-p. 3.

(Continued)

*Primary Examiner* — Anh Mai
*Assistant Examiner* — Brenitra M Lee
(74) *Attorney, Agent, or Firm* — Jianq Chyun IP Office

(57) ABSTRACT

A surface light source apparatus with dual-side emitting light includes at least a cathode wire structure, a transparent anode structure, a fluorescent layer and a low-pressure gas layer. The transparent anode structure is a surface structure, wherein the cathode wire structure and the transparent anode structure are parallel to each other. The fluorescent layer is located between the cathode wire structure and the transparent anode structure. The low-pressure gas layer fills the space between the cathode wire structure and the transparent anode structure and functions to induce the cathode evenly emitting electrons. The electron mean free path of the low-pressure gas layer allows at least a sufficient number of electrons to directly impact the fluorescent layer under an operation voltage.

13 Claims, 6 Drawing Sheets

(56) References Cited

FOREIGN PATENT DOCUMENTS

| | | |
|---|---|---|
| JP | 2004186129 | 7/2004 |
| JP | 2005044616 | 2/2005 |
| JP | 2005513732 | 5/2005 |
| JP | 2005-174852 | 6/2005 |
| JP | 2006-019262 | 1/2006 |
| JP | 2006040866 | 2/2006 |
| JP | 2006-179467 | 7/2006 |
| JP | 2006-244790 | 9/2006 |
| JP | 2006332044 | 12/2006 |
| JP | 2007035613 | 2/2007 |
| JP | 2007-287370 | 11/2007 |
| JP | 2008-218413 | 9/2008 |
| TW | 564454 | 12/2003 |
| TW | I228743 | 3/2005 |
| TW | I250813 | 3/2006 |
| TW | 200630459 | 9/2006 |
| WO | 2006022352 | 3/2006 |

OTHER PUBLICATIONS

"Office Action of Japan Counterpart Application (application No. 2011-118324)", issued on Nov. 15, 2011, p. 1-p. 3.

"Office Action of Japan Counterpart Application (application No. 2011-118325)", issued on Nov. 15, 2011, p. 1-p. 3.

"Office Action of Taiwan Counterpart Application", issued on Aug. 19, 2011, p. 1-p. 6.

"Office Action of Japan Counterpart Application", issued on May 15, 2012, p. 1-p. 2.

* cited by examiner

SURFACE LIGHT SOURCE APPARATUS WITH DUAL-SIDE EMITTING LIGHT

CROSS-REFERENCE TO RELATED APPLICATION

This application is a divisional of and claims the priority benefit of U.S. application Ser. No. 12/050,186, filed on Mar. 18, 2008, which claims the priority benefit of Taiwan application serial no. 96151533, filed on Dec. 31, 2007. The entirety of each of the above-mentioned patent applications is hereby incorporated by reference herein and made a part of this specification.

BACKGROUND OF THE INVENTION

1. Field of the Invention

The present invention generally relates to a light source apparatus, and more particularly, to a surface light source apparatus with dual-side emitting light to produce desired light.

2. Description of Related Art

A light source apparatus is widely used in our daily life. A traditional light source apparatus, for example, a bulb, produces visual light through the filament thereof with a high temperature after turning on. The bulb light source is counted as spot-like light source. After the spot-like light source, a tube-like light source was developed as well. Thereafter, through long time developments and modifications, a surface light source apparatus was lunched, which now is broadly used in, for example, flat displays.

A surface light source works based on various mechanisms. FIG. 1 is a cross-sectional diagram showing a mechanism of a conventional surface light source apparatus. Referring to FIG. 1, the light-emitting is produced by such a mechanism: connecting a power supply 106 to two electrode structures 100 and 102; producing an electric field under an operation voltage by the electrode structures 100 and 102 so as to establish gas discharge, termed as plasma discharge as well; ionizing the gas 104 so that the electrons 110 in the conductive gas likely hit the gas molecules to cause an electron transition with the ultraviolet emission; impacting the fluorescent layers 108a, 108b and 108c corresponding to different colors on the electrode structure 102 by the emitted ultraviolet (UV); finally emitting visual light 112 after the fluorescent layers 108a, 108b and 108c (for example, a red fluorescent layer, a green fluorescent layer and a blue fluorescent layer) absorb the UV. The electrode structure 100 herein is a light-emitting surface; therefore, the electrode structure 100 usually is a transparent material, for example, one composed of glass substrate and an ITO (indium tin oxide) transparent conductive layer.

FIG. 2 is a cross-sectional diagram showing another mechanism of a conventional surface light source apparatus. Referring to FIG. 2, a cathode structure layer 122 is disposed on a glass substrate 120, a plurality of conical conductors 124 are disposed on the cathode structure layer 122, a gate layer 126 is disposed on the conical conductors 124 and a plurality of holes are made on the gate layer 126 and the holes are corresponding to the conical conductors 124. An anode structure layer 128 with a transparent anode layer is disposed on another glass substrate. In addition, a fluorescent layer 130 is disposed on the anode structure layer 128, and a high electric field between the cathode and the anode makes electrons 132 escaped from the tips of the conical conductors 124. Thereafter, the electrons 132 are accelerated by the electric field and then impact the fluorescent layer 130 so as to make the fluorescent layer 130 emits light.

The above-mentioned two conventional light-emitting mechanisms respectively have advantages and disadvantages of their own. The mechanism based on gas discharge has advantages of structure simplicity and easily light-emitting, but to emit light, it needs to produce plasma first and the light-emitting mechanism is based on secondary energy conversion, which consumes a lot of electrical power. In contrast, the mechanism based on field emission, the corresponding light source is counted as a cold light source similar to a cathode ray tube (CRT), where electrons in high speed within vacuum directly impact fluorescence powder to emit visual light. The second mechanism is advantageous in high luminance, electricity-saving and easiness to form a surface light source structure, but disadvantageous in that the process needs to make an even emission material grow on a cathode or to spread the said material on the cathode, and to implement the process the second mechanism requires a needle-like structure or a carbon nanotube, so that a microstructure with a large aspect ratio (ratio of depth over width) enables the electrons to overcome the work function of the cathode to get rid of the cathode and then travel into a vacuum space. Therefore, the second mechanism is hard to evenly form a cathode structure with large area. In addition, for the second mechanism, the distance between the cathode and the anode for establishing field emission must be accurately controlled, which accordingly requires a strict specification on a spacer structure; plus, the vacuum packaging with the second mechanism is often a worried problem.

Note that the above-mentioned light source apparatuses are targeting the architecture for mono-direction light-emitting. However, such a mono-direction light-emitting apparatus nevertheless has application limitation.

SUMMARY OF THE INVENTION

Accordingly, the present invention is directed to a surface light source apparatus with dual-side emitting light served as a lamp source module for lighting or a display apparatus.

According to an embodiment, the present invention provides another surface light source apparatus with dual-side emitting light, which includes at least a cathode wire structure, a transparent anode structure, a fluorescent layer and a low-pressure gas layer. The transparent anode structure is a surface structure, wherein the cathode wire structure and the transparent anode structure are parallel to each other. The fluorescent layer is located between the cathode wire structure and the transparent anode structure. The low-pressure gas layer fills the space between the cathode wire structure and the transparent anode structure and functions to induce the cathode evenly emitting electrons. The electron mean free path of the low-pressure gas layer allows at least a sufficient number of electrons to directly impact the fluorescent layer under an operation voltage.

According to an embodiment, the present invention provides yet another surface light source apparatus with dual-side emitting light, which includes a first conductive transparent substrate and a second conductive transparent substrate opposite to each other, and the two conductive transparent substrates are respectively served as an anode structure. A fluorescent structure layer is located on the first conductive transparent substrate and the second conductive transparent substrate. A spacer is located between the first conductive transparent substrate and the second conductive transparent substrate to construct a space. A low-pressure gas layer fills the space and functions to induce the cathode evenly emitting electrons. A filamentary cathode structure is distributed on a plane between the first conductive transparent substrate and the second conductive transparent substrate. The electron mean free path of the low-pressure gas layer allows at least a sufficient number of electrons for transverse moving and to directly impact the fluorescent layer under an operation voltage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
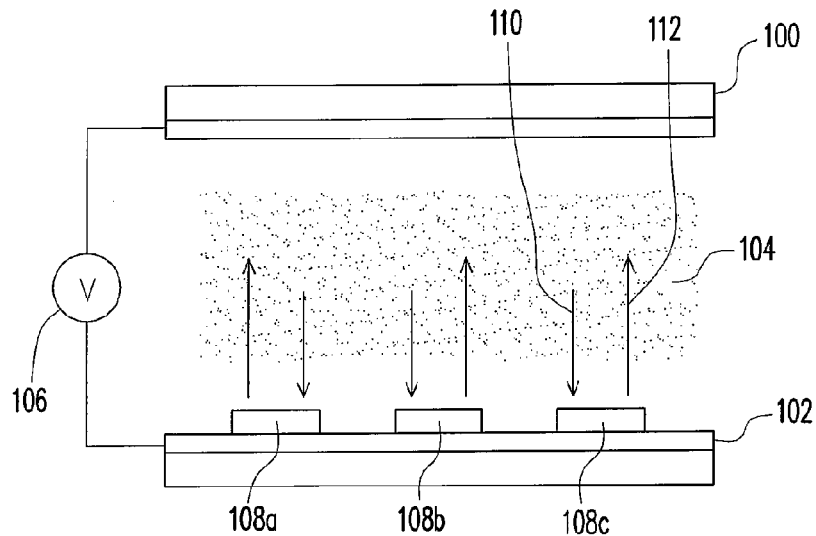
FIG. 1 is a cross-sectional diagram showing a mechanism of a conventional surface light source apparatus.
Figure 2:
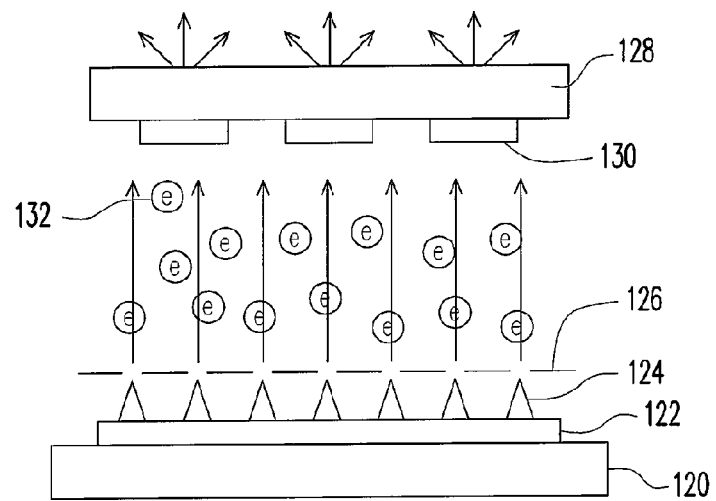
FIG. 2 is a cross-sectional diagram showing another mechanism of a conventional surface light source apparatus.

Reference will now be made in detail to the present preferred embodiments of the invention, examples of which are illustrated in the accompanying drawings. Wherever possible, the same reference numbers are used in the drawings and the description to refer to the same or like parts.

The present invention provides a surface light source apparatus with dual-side emitting light, which is able to achieve light-emitting effect by controlling the vacuum level of the gas based on the electron emission mechanism. In addition, in association with properly disposing transparent electrodes and transparent substrates, the present invention achieves dual-side emitting light. The mechanism the present invention adopts makes the process of fabricating a surface light source apparatus with dual-side evenly emitting light simpler. Moreover, by properly selecting fluorescent materials, the present invention can produce a surface UV light source or a light source with other wavelengths such as visual light or infrared light as well. In addition to the applications of lighting and decoration, the surface light source apparatus with dual-side emitting light of the present invention can be served as a light source for a display. The material of the transparent substrate can be a hard material or a flexible material. The surface light source apparatus can be planar one or curve one depending on a real need. In the following, several embodiments, but not limited by the present invention, are explained. In a real application, the depicted embodiments in follows can be combined for use or individually used.

The light source apparatus provided by the present invention takes advantage of gas conductive characteristic to educe sufficient electrons out of the cathode. While the electrons are travelling in the thin gas, due to a longer electron mean free path of the thin gas, there are still sufficient electrons in the travel end to directly impact, for example, the fluorescence powder on the anode to excite the fluorescence powder for emitting light, wherein the fluorescence powder is able to be excited to emit light. If UV is needed, the element proportion of the fluorescence powder can be adjusted to emit UV light, for example, the light in wavelength of 100 nm-400 nm. In addition, the luminous intensity can be controlled by adjusting the voltage.

Figure 3:
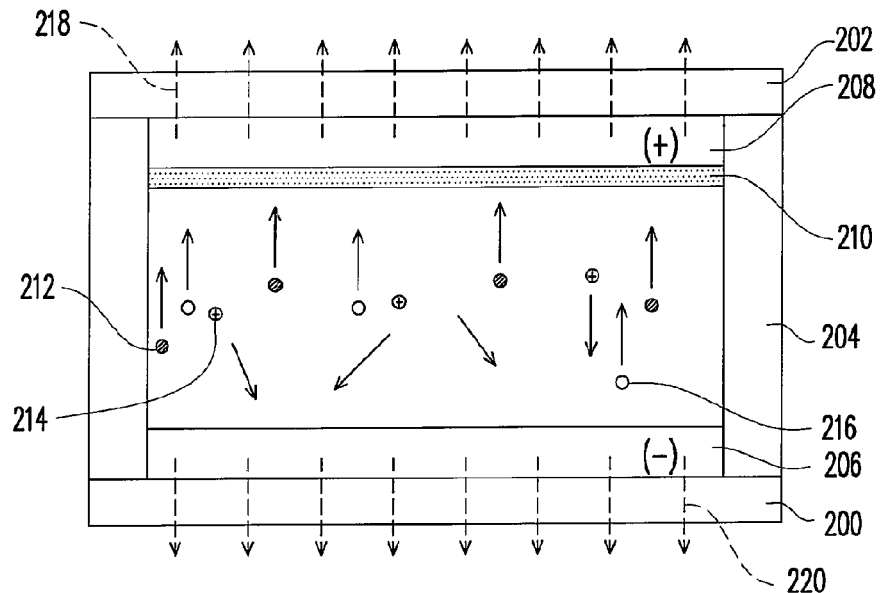
FIG. 3 is a cross-sectional diagram of a surface light source apparatus with dual-side emitting light according to an embodiment of the present invention.

FIG. 3 is a cross-sectional diagram of a surface light source apparatus with dual-side emitting light according to an embodiment of the present invention. Referring to FIG. 3, the present invention requires a space to accommodate low-pressure gas. The space for the low-pressure gas is formed by two transparent substrates 200 and 202 and spacers 204, wherein the low-pressure gas layer can be implemented by a general technique so as to be omitted for depiction.

A transparent cathode structure 206 of the present invention is disposed on the transparent substrate 200 and a transparent anode structure 208 is disposed on the transparent substrate 202. The spacers 204 are disposed between the transparent substrates 200 and 202 to form a space to accommodate a low-pressure gas layer. The space herein can be divided into a plurality of smaller spaces or a single one without dividing, which depends on an application need without specific limitation. The transparent material is, for example, indium tin oxide (ITO), indium zinc oxide (IZO) or other common materials of transparent conductive oxides.

The transparent cathode structure 206 and the transparent anode structure 208 are, for example, opposite to each other and respectively a surface structure. In general, a fluorescent layer 210 is located between the transparent cathode structure 206 and the transparent anode structure 208, and preferably disposed on the transparent anode structure 208. The low-pressure gas layer fills the space between the transparent cathode structure 206 and the transparent anode structure 208 for inducting the cathode to evenly emit electrons. The electron mean free path of the low-pressure gas layer allows at least sufficient electrons to directly impact the fluorescent layer under an operation voltage. The pressure of the low-pressure gas layer ranges between $10\text{-}10^{-3}$ torr, and the gas in the low-pressure gas layer includes, for example, for example, inert gases, atmosphere, He, Ne, Ar, Kr, Xe, $H_2$ or $CO_2$. The optimized pressure is depends on the gas and the distance between cathode and anode.

The educed electrons 212 in the low-pressure gas layer are accelerated to move towards the transparent anode structure 208. Due to a longer electron mean free path of the thin gas, there are still sufficient electrons 212 in the travel end to directly impact the fluorescent layer 210. On the other hand, the ionized positive gas ions 214 in the low-pressure gas layer would travel towards the transparent cathode structure 206 and impact the cathode, which also contributes for producing and increasing the secondary electrons 216. The way to effectively produce secondary electrons is depicted in later. Usually, different pressure requires a different operation voltage, wherein the luminance is increased with an increasing operation voltage and they are subject to a linear relationship.

The transparency property of the transparent substrates 200 and 202 enables the light 218 and 220 produced by the fluorescent layer 210 to travel through the transparent substrates 200 and 202 to achieve the effect of dual-side light-emitting.

The fluorescent layer 210 can be a mono-layer structure. However, the fluorescent layer 210 can also be, for example, an overlapped layer structure or a mixed layers structure, depending on the different fluorescent layer. Both the overlapped layer structure and the mixed layer structure are made of different fluorescent materials, wherein the overlapped layer structure is composed of, for example, a plurality of layers of different fluorescent layer materials to produce blended light, for example, white light blended bye and they are subject red light, green light and blue light. The mixed layers structure is a plurality of fluorescent layers in different colors are disposed at different regions to respectively produce light corresponding to a defined frequency to achieve a light-blending effect. In addition, except for the visual light materials, the fluorescent layer can use infrared material or UV material.

Figure 4:
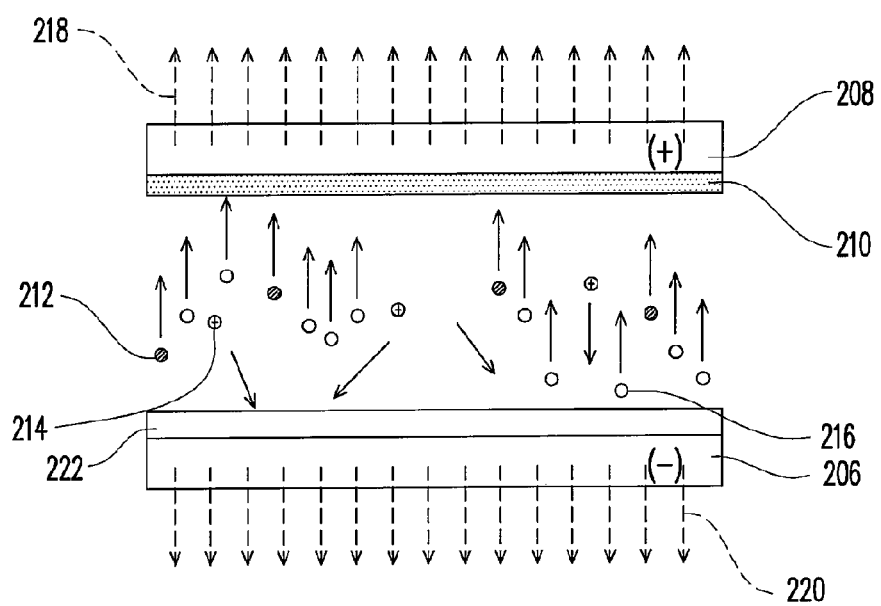
FIG. 4 is a cross-sectional diagram of a surface light source apparatus with dual-side emitting light according to another embodiment of the present invention.

The above-mentioned surface light source apparatus with dual-side emitting light is a basic structure only. In order to promote the luminous efficiency, an additional auxiliary function layer is disposed on the transparent cathode structure 206 or the transparent anode structure 208. FIG. 4 is a cross-sectional diagram of a surface light source apparatus with dual-side emitting light according to another embodiment of the present invention. Referring to FIG. 4, to more effectively produce secondary electrons 216 to increase the luminance, a secondary electron material layer 222 is disposed, for example, on the transparent cathode structure 206, wherein the material of the secondary electron material layer 222 includes, for example, magnesium oxide (MgO), terbium oxide ($Tb_2O_3$), lanthanum oxide ($La_2O_3$) or cerium oxide ($CeO_2$).

Figure 5:
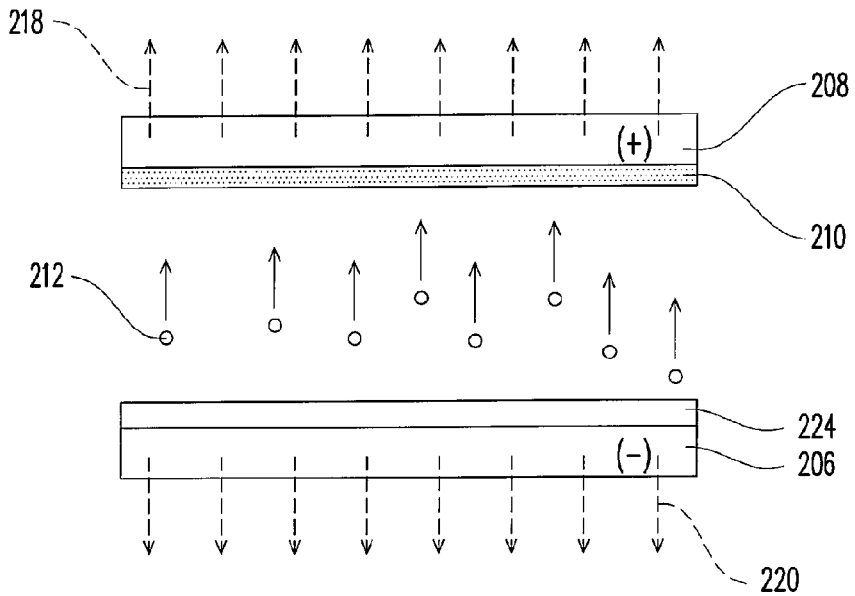
FIGS. 5-7 are cross-sectional diagrams of surface light source apparatuses with dual-side emitting light according to other embodiments of the present invention.
Figure 6:
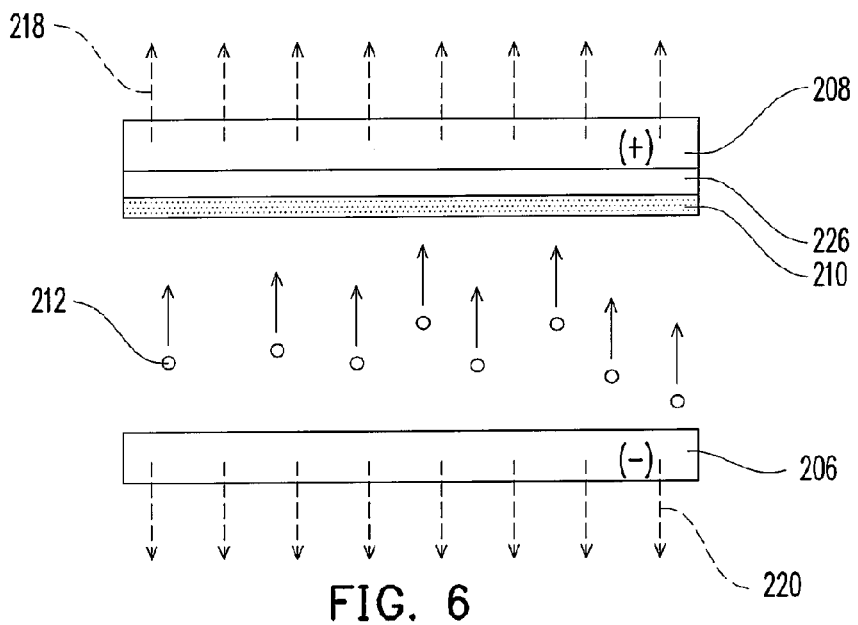
Figure 7:
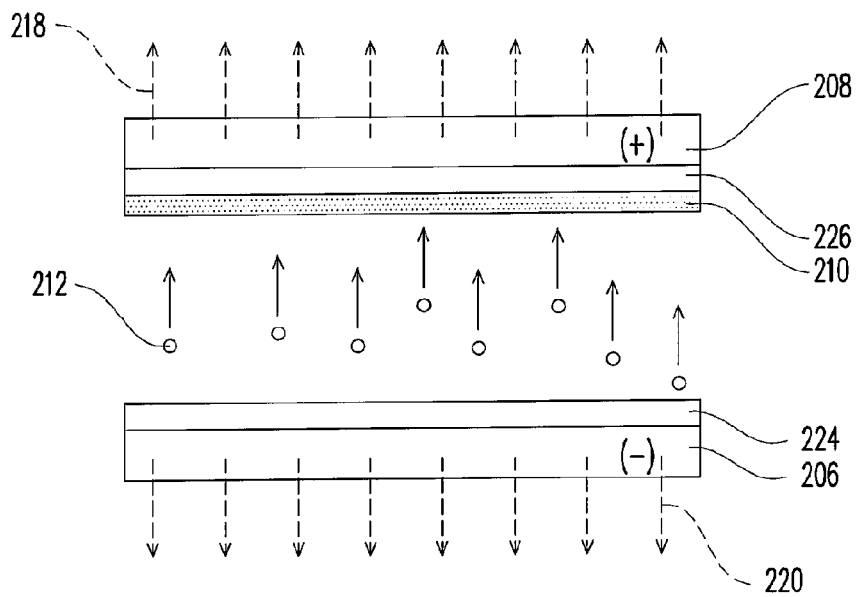

FIGS. 5-7 are cross-sectional diagrams of surface light source apparatuses with dual-side emitting light according to other embodiments of the present invention. Referring to FIG. 5, an emitter material layer 224 can be further disposed on the transparent cathode structure 206 to provide a surface structure for making discharge easier and lowering the operation voltage. The emitter material layer 224 is made of, for example, includes metal material, carbon nanotubes, carbon nanowalls, carbon nanoporous material, cylinder-like ZnO or ZnO.

In the embodiment of FIG. 5, the emitter material layer 224 is disposed, for example but not limited to, on the transparent cathode structure 206. Referring to FIG. 6, another emitter material layer 226 is disposed on the transparent anode structure 208 for facilitating discharge as well. Referring to FIG. 7, two emitter material layers 224 and 226 are disposed respectively on the transparent cathode structure 206 and the transparent anode structure 208.

Although in FIGS. 5-7 the structure has an emitter material layer, but if needed, a secondary electron material layer can be additionally disposed as shown by FIG. 4. In fact, the embodiments of the present invention can be implemented in various ways or in a combination form thereof, which the present invention does lot limit.

Figure 8:
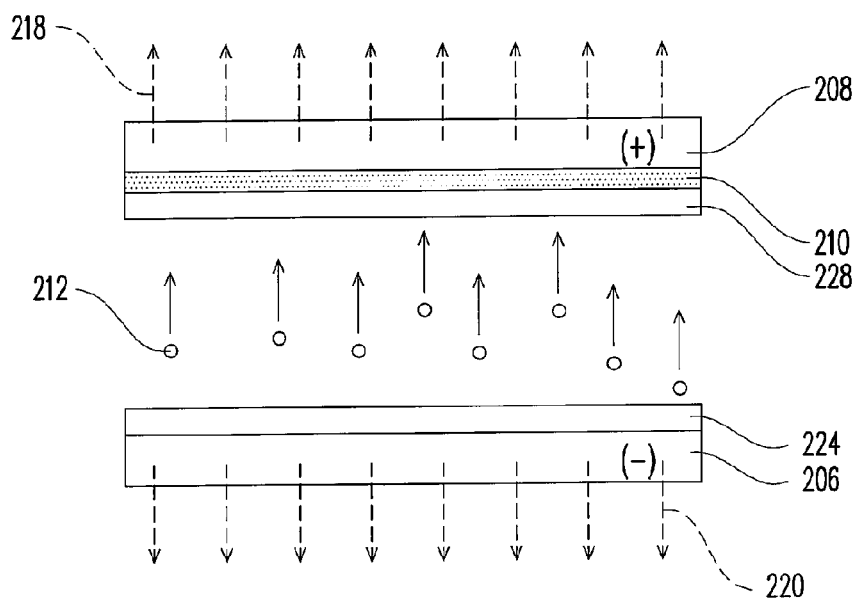
FIGS. 8-11 are cross-sectional diagrams of surface light source apparatuses with dual-side emitting light according to yet another embodiment of the present invention.

FIG. 8 is a cross-sectional diagram of surface light source apparatuses with dual-side emitting light according to yet another embodiment of the present invention. Referring to FIG. 8, in the embodiment, an additional transparent conductive protection layer 228 is disposed on the fluorescent layer 210, wherein the transparent conductive protection layer 228 is conductive for protecting the fluorescent layer 210; in more detail, the transparent conductive protection layer 228 prevents the fluorescent layer 210 from being impacted by ions and avoids the fluorescence body from burning and damage so as to extend the lifetime of the fluorescent layer 210. Since the transparent conductive protection layer 228 is for protecting, only one thin layer having, for example, a couple of nanometres is enough to form the transparent conductive protection layer 228. Besides, the emitter material layer 224 can be disposed, for example, on the transparent cathode structure 206.

Figure 9:
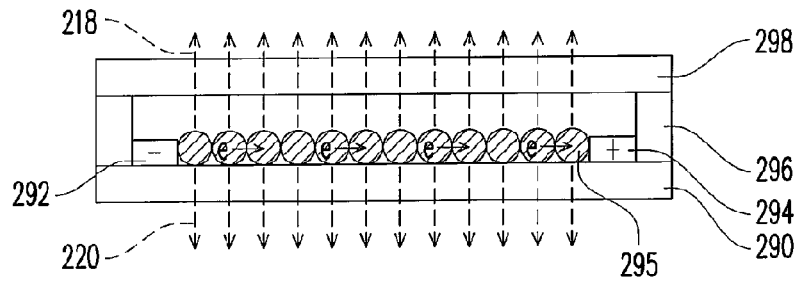

The fluorescent layer in the above-mentioned embodiment is designed as a surface structure, but it can be modified as well. FIG. 9 is a cross-sectional diagram of surface light source apparatuses with dual-side emitting light according to yet another embodiments of the present invention. Referring to FIG. 9, two transparent substrates 290 and 298 and spacers 296 are disposed similarly to the foregoing depiction so as to construct a space to accommodate low-pressure gas. Bit the present embodiment is unique in the arrangement of the electrodes and fluorescent layer. A cathode structure 292 and an anode structure 294 are disposed on a same substrate 290. Since the cathode structure 292 and the anode structure 294 occupy smaller areas, therefore, they are made of transparent conductive material or non-transparent conductive material, and preferably transparent conductive material. A fluorescent structure layer is disposed on the transparent substrate 290 and located between the cathode structure 292 and the anode structure 294.

A fluorescent layer includes, for example, a plurality of fluorescence mono-bodies, wherein the surface of each fluorescence mono-body has a fluorescent material layer. The fluorescence mono-body 295 is, for example, a sphere-like fluorescence mono-body and the surface of each fluorescence mono-body 295 has a fluorescent material layer; the fluorescence mono-body 295 can be a cylinder-like fluorescence mono-body and the surface thereof has a fluorescent material layer as well. In the embodiment, electrons move in a direction as shown by an arrow and the electrons are transverse moving. Since both the transparent substrates 290 and 298 are transparent, the produced light is emitted from the two sides.

Figure 10:
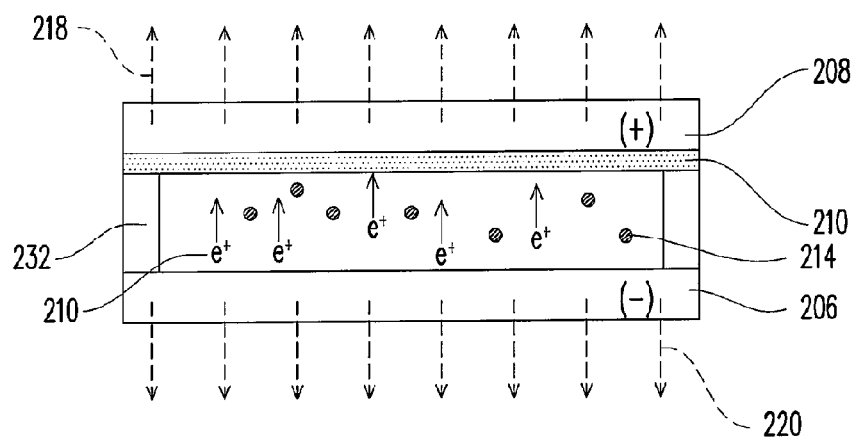

FIG. 10 is a cross-sectional diagram of surface light source apparatuses with dual-side emitting light according to yet another embodiments of the present invention. Referring to FIG. 10, in a surface light source apparatus with dual-side emitting light, the spacers 232 are allowed to be disposed between the electrodes 206 and the fluorescent layer 210 to construct a space for accommodating the low-pressure gas, where the spacers 232 between the substrates are not in charge of supporting the substrates, which reflects a modification of the above-mentioned embodiment for partitioning the space.

Figure 11:
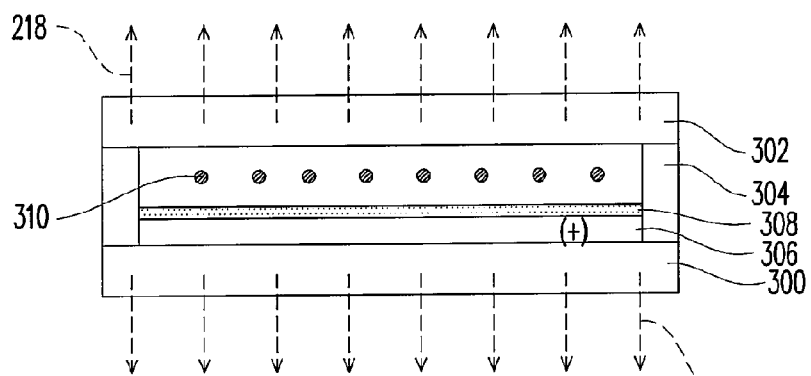

Similarly to FIG. 3, the electrode structure can be modified as well. FIG. 11 is a cross-sectional diagram of surface light source apparatuses with dual-side emitting light according to yet another embodiments of the present invention. Referring to FIG. 11, two transparent substrates 300 and 302 and spacers 304 construct a space for accommodating low-pressure gas as described before. In the embodiment, at least a cathode wire structure 310 is disposed in the space over the transparent substrate 300. In the embodiment, the cathode wire structure 310 is, for example, a plurality of ones. A transparent anode structure 306 is a surface structure, formed on the transparent substrate 300 and parallel to the transparent anode structure 306. A fluorescent layer 308 is located between the cathode wire structures 310 and the transparent anode structure 306, while the fluorescent layer 308 is directly formed on, for example, the cathode wire structures 310.

Since the cathode wire structure 310 is, for example, a filamentary structure, thus, does not affect the light-emitting quality.

Figure 12A:
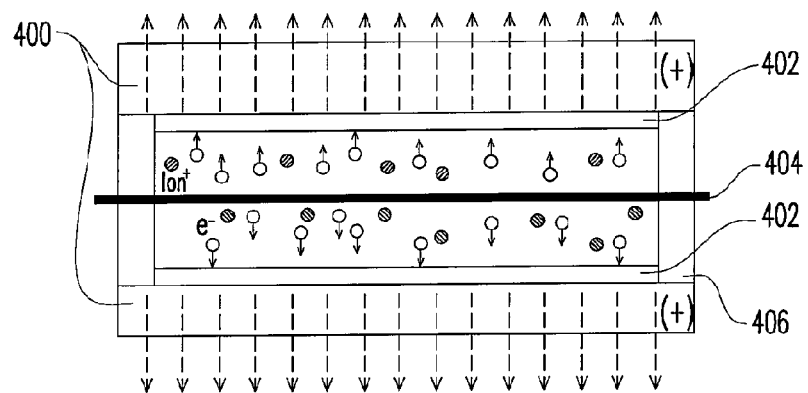
FIGS. 12A and 12B are a side view diagram and a top view diagram of a surface light source apparatus with dual-side emitting light according to yet another embodiment of the present invention.
Figure 12B:
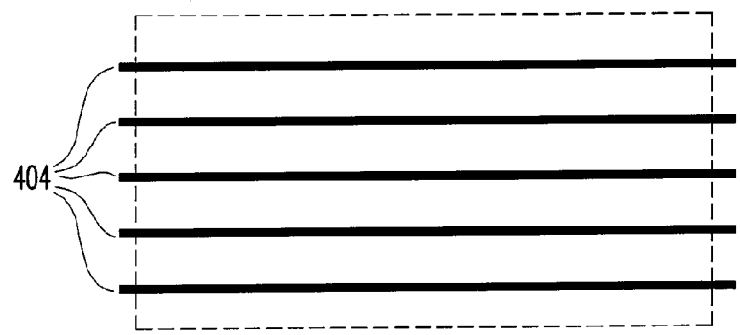

In the same way, the present invention can have other modifications. FIGS. 12A and 12B are a side view diagram and a top view diagram of a surface light source apparatus with dual-side emitting light according to yet another embodiment of the present invention. Referring to FIG. 12A, two conductive transparent substrates 400 and spacers 406 construct a space for accommodating low-pressure gas as described before, wherein the conductive transparent substrate 400 is, for example, conductive glass served as an anode. A fluorescent layer 402 is disposed on the two conductive transparent substrates 400. At least a cathode wire structure 404 is disposed in the space between the two conductive transparent substrates 400. In the embodiment, the cathode wire structure 404 is, for example, a plurality of ones. The cathode wire structures 404 are distributed as shown by FIG. 12B, on a plane between the two conductive transparent substrates. Since the cathode wire structure 404 is, for example, a surface structure, thus, the cathode wire structure 404 can be served as a dual-side emitting light substrate.

The surface light source apparatus with dual-side emitting light provided by the present invention can be further applied to dual-side image displaying or curve surface image displaying.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A surface light source apparatus with dual-side emitting light, comprising:
    at least a cathode wire structure;
    a transparent anode structure, characterizing a surface structure, wherein the cathode wire structure and the transparent anode structure are parallel to each other;
    a fluorescent layer, located between the cathode wire structure and the transparent anode structure; and
    a low-pressure gas layer, filling a space between the cathode wire structure and the transparent anode structure and functioning to induce cathode for evenly emitting electrons,
    wherein an electron mean free path of the low-pressure gas layer allows at least sufficient electrons to directly impact the fluorescent layer under an operation voltage,
    wherein the cathode wire structure comprises a plurality of wires in the space aligned in parallel and all at one direction and a portion of the wires is structurally floating in the space.

2. The surface light source apparatus with dual-side emitting light according to claim 1, further comprising a first transparent substrate, a second transparent substrate and a spacer, wherein the spacer is located between the first transparent substrate and the second transparent substrate to construct a space for accommodating the low-pressure gas layer, wherein the cathode wire structure is located in the space over the first transparent substrate, and the transparent anode structure and the fluorescent layer are formed on the first transparent substrate.

3. The surface light source apparatus with dual-side emitting light according to claim 1, further comprising an emitter material layer disposed on the transparent anode structure, wherein the emitter material layer is a flat layer with a smooth surface without acute protruding tips.

4. The surface light source apparatus with dual-side emitting light according to claim 3, wherein the emitter material layer comprises a surface structure to facilitate discharging.

5. The surface light source apparatus with dual-side emitting light according to claim 1, further comprising a transparent conductive protection layer disposed on the fluorescent layer for protecting the fluorescent layer.

6. The surface light source apparatus with dual-side emitting light according to claim 1, wherein the pressure of the low-pressure gas layer ranges between $10$-$10^{-3}$ torr.

7. The surface light source apparatus with dual-side emitting light according to claim 1, wherein the fluorescent layer comprises a mono-layer structure.

8. The surface light source apparatus with dual-side emitting light according to claim 1, wherein the fluorescent layer comprises an overlapped layers structure or an auxiliary structure respectively containing various different fluorescence materials.

9. The surface light source apparatus with dual-side emitting light according to claim 1, wherein the fluorescent layer has a plurality of regions for respectively producing light with a corresponding frequency.

10. A surface light source apparatus with dual-side emitting light, comprising:
    a first conductive transparent substrate and a second conductive transparent substrate, opposite to each other and served as an anode structure;
    a fluorescent structure layer, disposed on the first conductive transparent substrate and the second conductive transparent substrate;
    a spacer, disposed between the first conductive transparent substrate and the second conductive transparent substrate to construct a space;
    a low-pressure gas layer, filling a space and functioning to induce cathode for evenly emitting electrons; and
    a filamentary cathode structure, distributed on a plane between the first conductive transparent substrate and the second conductive transparent substrate, wherein the filamentary cathode structure comprises a plurality of filaments in the space aligned in parallel and all at one direction and a portion of the filaments is structurally floating in the space,
    wherein an electron mean free path of the low-pressure gas layer allows at least sufficient electrons to transversely move and directly impact the fluorescent structure layer under an operation voltage.

11. The surface light source apparatus with dual-side emitting light according to claim 10, wherein the pressure of the low-pressure gas layer ranges between $10$-$10^{-3}$ torr.

12. The surface light source apparatus with dual-side emitting light according to claim 1, wherein a transverse cross-sectional shape of the cathode wire structure is substantially round.

13. The surface light source apparatus with dual-side emitting light according to claim 10, wherein a transverse cross-sectional shape of the filamentary cathode structure is substantially round.

* * * * *